(12) United States Patent
Fukuda et al.

(10) Patent No.: US 10,337,173 B2
(45) Date of Patent: Jul. 2, 2019

(54) WORK MACHINE

(71) Applicant: KUBOTA CORPORATION, Osaka-shi (JP)

(72) Inventors: Yuji Fukuda, Sakai (JP); Ryosuke Kinugawa, Sakai (JP); Hiroaki Nakagawa, Sakai (JP)

(73) Assignee: KUBOTA CORPORATION, Osaka-shi (JP)

( * ) Notice: Subject to any disclaimer, the term of this patent is extended or adjusted under 35 U.S.C. 154(b) by 182 days.

(21) Appl. No.: 15/391,750

(22) Filed: Dec. 27, 2016

(65) Prior Publication Data

US 2017/0107696 A1 Apr. 20, 2017

Related U.S. Application Data

(63) Continuation of application No. PCT/JP2015/058553, filed on Mar. 20, 2015.

(30) Foreign Application Priority Data

Jul. 31, 2014 (JP) .................................. 2014-156335

(51) Int. Cl.
*F15B 11/08* (2006.01)
*E02F 9/22* (2006.01)
(Continued)

(52) U.S. Cl.
CPC ............ *E02F 9/2285* (2013.01); *E02F 9/226* (2013.01); *E02F 9/2228* (2013.01);
(Continued)

(58) Field of Classification Search
CPC ................ F15B 13/0433; F15B 21/045; F15B 2211/66; F15B 2211/67; F16H 61/433; E02F 9/2285

See application file for complete search history.

(56) References Cited

U.S. PATENT DOCUMENTS 8,136,355 B2 * 3/2012 Yasuda ................. F04C 14/065
60/449
8,424,298 B2 * 4/2013 Ariga .................... E02F 9/2225
60/329
(Continued)

FOREIGN PATENT DOCUMENTS

| JP | 3308019 B2 | 9/1994 |
| JP | 11-336701 | 12/1999 |
| JP | 2003-307180 | 10/2003 |

OTHER PUBLICATIONS

International Search Report for corresponding International Application No. PCT/JP2015/058553, dated Jun. 9, 2015.

*Primary Examiner* — Thomas E Lazo
(74) *Attorney, Agent, or Firm* — Mori & Ward, LLP

(57) ABSTRACT

A work machine includes an engine, a pilot pump to be driven by the engine to supply a pilot fluid, an operation pump to receive a first pilot fluid to change an output power in accordance with the first pilot fluid, a pilot fluid tube provided between the pilot pump and the operation pump, an operation valve connected to the pilot fluid tube to output the first pilot fluid, the first pilot fluid being a part of the pilot fluid supplied from the pilot fluid, a temperature sensor to measure a temperature of at least one of an operation fluid including the pilot fluid, a cooling water, an engine oil, and an outside air, and a pressure controller to control a first pilot pressure of the pilot fluid outputted from the operation valve when a temperature measured by the temperature sensor is equal to or higher than a first temperature.

7 Claims, 10 Drawing Sheets

(51) Int. Cl.
- *F15B 13/043* (2006.01)
- *F15B 19/00* (2006.01)
- *F16H 61/433* (2010.01)
- *E02F 3/34* (2006.01)
- *F15B 21/045* (2019.01)

(52) U.S. Cl.
CPC .......... *E02F 9/2253* (2013.01); *E02F 9/2267* (2013.01); *E02F 9/2292* (2013.01); *E02F 9/2296* (2013.01); *F15B 11/08* (2013.01); *F15B 13/0433* (2013.01); *F15B 19/00* (2013.01); *F16H 61/433* (2013.01); *E02F 3/3414* (2013.01); *F15B 21/045* (2013.01); *F15B 2211/20523* (2013.01); *F15B 2211/20553* (2013.01); *F15B 2211/329* (2013.01); *F15B 2211/355* (2013.01); *F15B 2211/526* (2013.01); *F15B 2211/633* (2013.01); *F15B 2211/6343* (2013.01); *F15B 2211/6355* (2013.01); *F15B 2211/66* (2013.01); *F15B 2211/665* (2013.01); *F15B 2211/67* (2013.01); *F15B 2211/857* (2013.01)

(56) References Cited

U.S. PATENT DOCUMENTS

| | | | |
|---|---|---|---|
| 2011/0146283 A1* | 6/2011 | Narazaki | E02F 9/2235 60/701 |
| 2013/0213020 A1* | 8/2013 | Ishikawa | B60W 10/06 60/311 |

* cited by examiner

US 10,337,173 B2

WORK MACHINE

CROSS-REFERENCE TO RELATED APPLICATIONS

The present application is a continuation application of International Application No. PCT/JP2015/058553, filed Mar. 20, 2015, which claims priority to Japanese Patent Application No. 2014-156335, filed Jul. 31, 2014. The contents of these applications are incorporated herein by reference in their entirety.

BACKGROUND OF THE INVENTION

Field of the Invention

The present invention relates to a work machine.

Discussion of the Background

Japanese Patent Publication No. 3308019 has disclosed a technique for a work machine to control a hydraulic pump on the basis of a temperature such as a water temperature. Japanese Patent Publication No. 3308019 discloses a hydraulic control device for a hydraulic construction machine including a variable displacement pump, a hydraulic actuator configured to be driven by a discharged fluid of the pump, and a control valve configured to control a flow rate of a pressured fluid in accordance with a switching amount, the pressured fluid being introduced to the hydraulic actuator. The hydraulic control device includes a detection means configured to detect that a cooling water temperature of a motor or a temperature of an engine oil is equal to or higher than a predetermined temperature and then to output a high temperature signal, and a discharge amount control means configured to reduce the switching amount of the control valve to be lower than the switching mount of a state not outputting the high temperature signal, when the high temperature signal is outputted.

SUMMARY OF THE INVENTION

According to one aspect of the present invention, a work machine includes an engine, a pilot pump to be driven by the engine to supply a pilot fluid, an operation pump to receive a first pilot fluid to change an output power in accordance with the first pilot fluid, the first pilot fluid being a part of the pilot fluid supplied from the pilot pump, a pilot fluid tube provided between the pilot pump and the operation pump, an operation valve connected to the pilot fluid tube to output the first pilot fluid, a temperature sensor to measure a temperature of at least one of an operation fluid including the pilot fluid, a cooling water, an engine oil, and an outside air, and a pressure controller to control a first pilot pressure of the pilot fluid outputted from the operation valve when a temperature measured by the temperature sensor is equal to or higher than a first temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
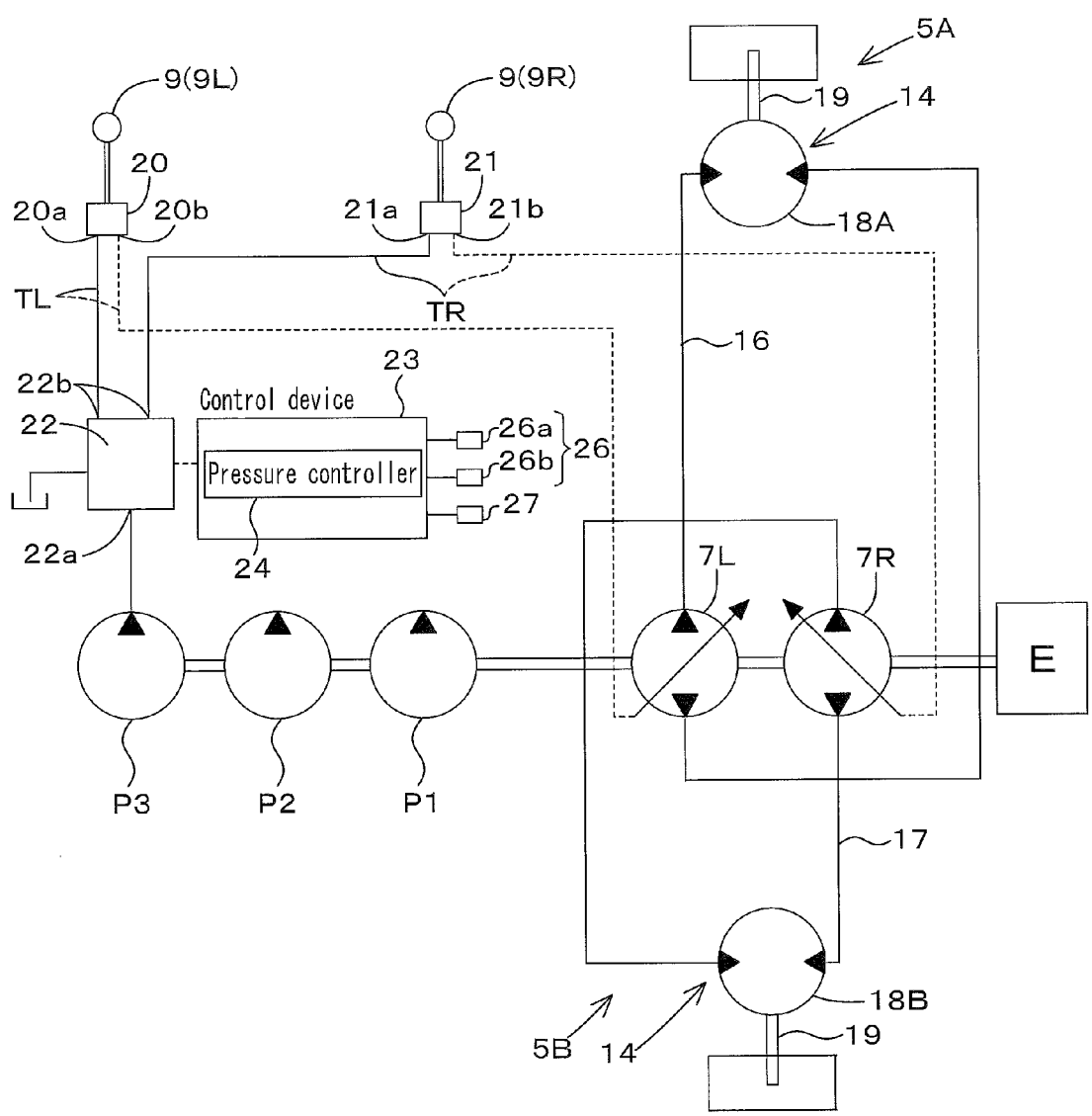
FIG. 1 is a schematic view illustrating a hydraulic circuit for traveling according to a first embodiment of the present invention.

The embodiment will now be described with reference to the accompanying drawings, wherein like reference numerals designate corresponding or identical elements throughout the various drawings. The drawings are to be viewed in an orientation in which the reference numerals are viewed correctly.

Referring to drawings, embodiments of the present invention will describe below a hydraulic system for a work machine and a work machine having the hydraulic system.

First Embodiment

Figure 12:
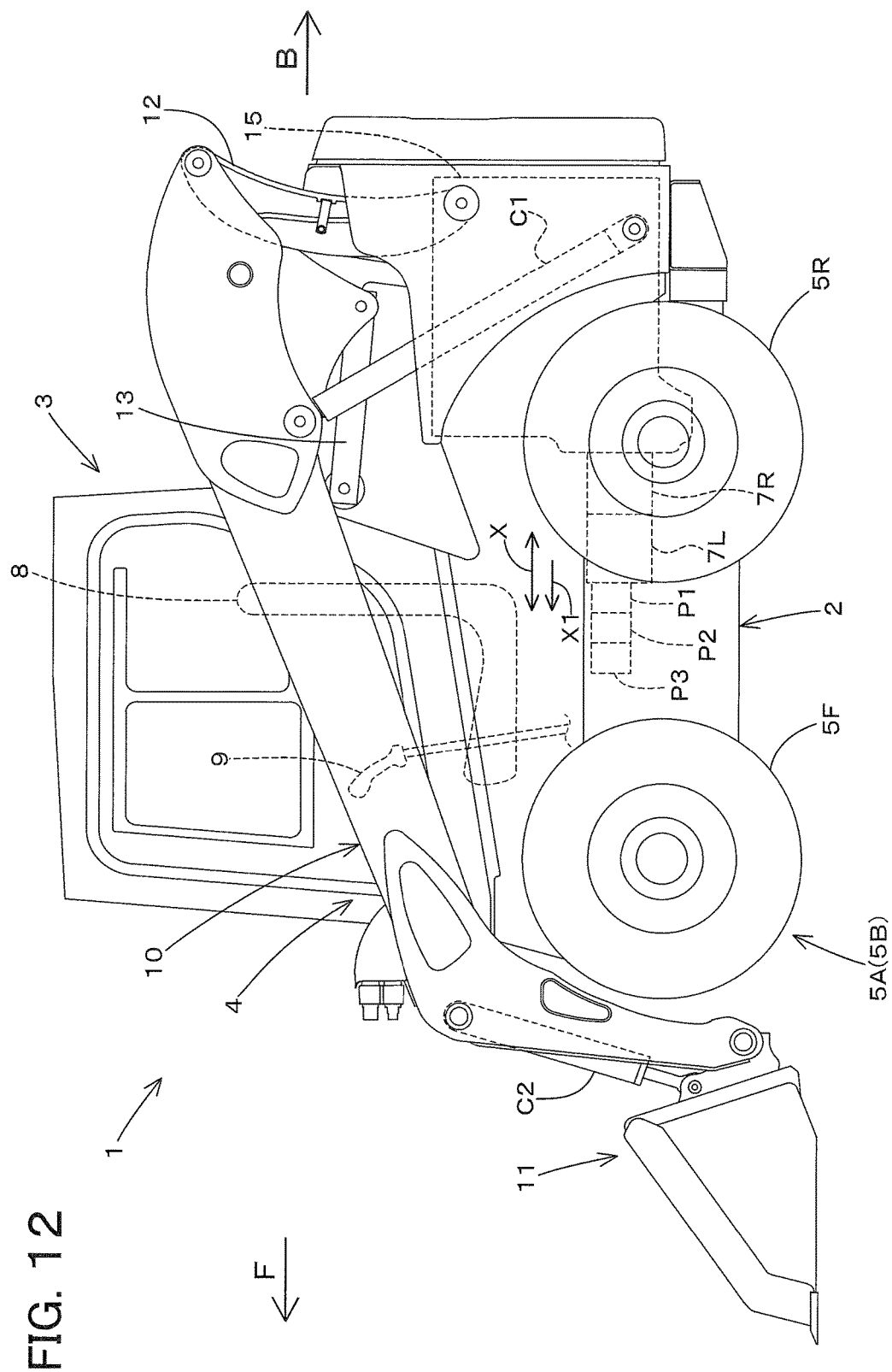
FIG. 12 is a side view illustrating a whole of a skid steer loader according to the embodiments.

FIG. 12 shows a skid steer loader (SSL) 1 exemplified as a work machine (a construction machine vehicle). As shown in FIG. 12, the skid steer loader 1 includes a machine frame 2 and a cabin 3 mounted on the machine frame 2. In addition, the skid steer loader 1 includes an operation device 4 and travel devices (devices to be driven) 5A and 5B. The operation device 4 is installed on the machine frame 2. The travel devices 5A and 5B are disposed on a right side of the machine frame 2 and on a left side of the machine frame 2. An engine 15 is mounted on a rear portion inside the machine frame 2.

An operator seat 8 is disposed on a rear portion inside the cabin 3. A right operation member 9 and a left operation member 9 (for example, travel levers) are disposed on a front portion of the operator seat 8, the right operation member 9 and the left operation member 9 being used for operations of the travel device 5A and the travel device 5B. The left travel lever 9L is a lever used for operation of the left travel device 5A (an HST pump 7L on the front side). The right travel lever 9R is a lever used for operation of the right travel device 5B (an HST pump 7R on the rear side).

The operation device 4 includes a boom 10, a bucket 11, a lift link 12, a control link 13, a boom cylinder C1, and a bucket cylinder C2. The boom 10 is arranged on the right side of the machine frame 2. Another boom 10 is arranged on the left side of the machine frame 2. The bucket 11 is disposed on tip ends (front ends) of the booms 10 disposed on the right side and the left side. The bucket 11 is capable of being swung upward and downward. In addition, the bucket 11 is capable of being attached to and detached from the tip ends (the front ends) of the booms 10 disposed on the right side and the left side. A hydraulic attachment is capable of being attached to the tip ends (the front ends) of the booms 10 instead of the bucket 11.

The lift link 12 and the control link 13 support a base portion (a rear portion) of the boom 10. The boom cylinder C1 moves the boom 10 upward and downward. The bucket cylinder C2 moves the bucket 11 upward and downward.

The lift link 12, the control link 13, and the boom cylinder C1 are disposed on the left side and the right side of the machine frame 2, corresponding to the booms disposed on the left side and the right side. An upper end portion of the lift link 12 is pivotally supported by an upper portion of a rear end of the machine frame 2.

The control link 13 is arranged in front on the lift link 12. A rear end portion of the control link 13 is pivotally supported by a lower end portion of the base portion of the boom 10. A front end portion of the control link 13 is pivotally supported by the machine frame 2.

The boom cylinder C1 is pivotally supported at the upper portion of the boom cylinder C1 by a front portion of the base portion of the boom 10, and is pivotally supported at the lower portion of the boom cylinder C1 by a lower portion of the rear end portion of the machine frame 2. The boom cylinder C1 is stretched and shortened, and thereby the boom 10 is swung such that the tip end portion of the boom 10 is moved upward and downward with the base portion of the boom 10 supported by the lift link 12 and the control link 13.

The bucket cylinders C2 are disposed on the booms 10 that are arranged on the left side and the right side, and are stretched and shortened to swing the bucket 11.

In the embodiment, the travel devices 5A and 5B disposed on the left side and the right side employ wheeled travel devices 5A and 5B, each of the wheeled travel devices 5A and 5B having a front wheel 5F and a rear wheel 5R. Meanwhile, the travel devices 5A and 5B disposed on the left side and the right side may employ crawler-type travel devices 5A and 5B (including semicrawler-type travel devices).

FIG. 1 illustrates a hydraulic circuit for traveling of the skid steer loader 1.

As shown in FIG. 1 and FIG. 12, a pump housing is disposed on a side close to a front portion of the engine 15. In the pump housing, hydraulic pumps for traveling drive 7R and 7L, that is, a pair of HST pumps 7R and 7L are arranged parallel in the front to rear direction X.

A first pump P1, a second pump P2, and a third pump P3 are arranged in the front to rear direction X in front X1 of the HST pump 7L disposed on the front side. The HST pumps 7L and 7R, the first to third pumps P1, P2, and P3 are driven by the engine 15.

The HST pumps 7L and 7R disposed on the front side and the rear side drive the travel devices 5A and 5B disposed on the left side and the right side, and each of the HST pumps 7L and 7R is constituted of the variable displacement pump having a swash plate.

Each of the first to third pumps P1, P2, and P3 is constituted of a constant displacement gear pump. The first pump P1 is a pump configured to drive a hydraulic actuator installed in the operation device 4 and drive a hydraulic actuator of a hydraulic attachment attached to the operation device 4. The second pump P2 is used for increasing the operation fluid. The third pump P3 is used mainly for supplying a pilot fluid (a first pilot fluid).

The HST pumps 7L and 7R disposed on the front side and the rear side constitute a part of an HST (HydroStatic variable Transmission) 14 configured to drive the travel devices 5A and 5B disposed on the left side and the right side. The HST 14 is provided to each of the travel devices 5A and 5B disposed on the left side and the right side.

The HST pump 7L disposed on the front side is used for driving the travel device 5A disposed on the left side. The HST pump 7R disposed on the rear side is used for driving the travel device 5B disposed on the right side.

The HST 14 includes the HST pumps 7L and 7R and a pair of travel motors (the HST motors 18A and 18B). The pair of travel motors (the HST motors 18A and 18B) are constituted of the HST pumps 7L and 7R and a pair of speed change fluid tubes 16 and 17. The HST pumps 7L and 7R and a pair of speed change fluid tubes 16 and 17 are connected to have a closed circuit.

Inclination angles of the swash plates of the HST pumps 7L and 7R are changed by the pilot fluid supplied from the third pump P3. Then, the inclination angles of the swash plates of the HST pumps 7L and 7R change discharge directions of and discharge flow rates of the operation fluids discharged from the HST pumps 7L and 7R. That is, the HST pumps 7L and 7R are pumps (operation pumps) configured to change the output powers in accordance with the pilot pressures of the pilot fluids.

In this manner, revolution directions of and revolution speeds of output shafts 19 of the HST motors 18A and 18B are changed, and thus the skid steer loader 1 is capable of traveling forward and backward and changing the speeds. In particular, the HST motors 18A and 18B are driven by the discharge fluids from the HST pumps 7L and 7R. In the embodiment, the revolution powers outputted from the HST motors 18A and 18B drive the front wheels 5F and rear wheels 6R.

A hydraulic circuit for traveling will be explained below.

As shown in FIG. 1, the travel lever 9 includes a left travel lever 9L and a right travel lever 9R. The left travel lever 9L is used for driving the HST pump 7L disposed on the left side. The right travel lever 9R is used for driving the HST pump 7R disposed on the right side. The travel lever 9 (the left travel lever 9L and the right travel lever 9R) is supported to be capable of being swung forward and backward.

The left travel lever 9L is provided with a left remote control valve 20. The left remote control valve 20 changes a fluid pressure of the pilot fluid (referred to as a pilot pressure) on the basis of a leftward operation amount of the swinging of the left travel lever 9L. The right travel lever 9R is provided with a right remote control valve 21. The right remote control valve 21 changes a pilot pressure on the basis of a rightward operation amount of the swinging of the right travel lever 9R.

The remote control valves (the left remote control valve 20 and the right remote control valve 21) are mechanical valves configured to change the pilot pressures on the basis of the operation amounts of the travel levers 9 (the left travel lever 9L and the right travel lever 9R). In particular, the remote control valve is constituted of a pilot valve having a spool that is directly operated by an operation portion moved in accordance with the swinging of the travel lever 9.

The left remote control valve 20 is connected to a pilot fluid tube TL extending from the third pump P3 to the HST pump 7L. The right remote control valve 20 is connected to a pilot fluid tube TR extending to the HST pump 7R.

In addition, operation valves 22 are disposed on the pilot fluid tubes TL and TR between the remote control valves (the left remote control valve 20 and the right remote control valve 20) and the third pump P3 (the pilot pump).

In particular, the third pump P3 is connected to an input port 22a of the operation valve 22. In addition, an input port 20a of the left remote control valve 20 and an input port 21a of the right remote control valve 21 are connected to an output port 22b of the operation valve 22.

The operation valve 22 is a valve configured to vary the pilot pressure to be supplied from the third pump P2 to the remote control valves (the left remote control valve 20 and the right remote control valve 21), and is controlled by a control device (a controller) 23 constituted of a CPU and the like.

In particular, the operation valve 22 is constituted of an electromagnetic proportional valve configured to vary an aperture of the electromagnetic proportional valve on the basis of a control signal outputted from the control device 23. The operation valve 22 varies the aperture, and thus varies the pilot pressures to be applied to the left remote control valve 20 and the right remote control valve 21.

When the pilot pressures of the left remote control valve 20 and the right remote control valve 21 are varied, the pilot pressures discharged from an output port 20b of the left remote control valve 20 and from an output port 21b of the right remote control valve 21 are varied to change the outputs of the HST pumps 7L and 7R.

A measurement device 26 (a temperature sensor 26) is connected to the control device 23. The measurement device 26 is capable of measuring a temperature relating to a heat balance. The measurement device 26 measures a temperature of a cooling medium for cooling the engine and the like and measures a temperature of an operation medium for operating the actuators.

In particular, the measurement device 26 includes a water temperature sensor 26a and a fluid temperature sensor 26b. The water temperature sensor 26a measures the temperature of the cooling medium, that is, a water temperature of the cooling water. The fluid temperature sensor 26b measures the temperature of the operation medium, that is, a temperature of the operation fluid (a fluid temperature) including the pilot fluid. In addition, an engine revolution sensor 27 is connected to the control device 23. The engine revolution sensor 27 measures a revolution speed of the engine.

The control device 23 includes a pressure control part (a pressure controller) 24. The pressure control part 24 controls the pilot pressure on the basis of the temperature (the water temperature and/or the fluid temperature) measured by the measurement device 26. The pressure control part 24 is constituted of an electronic component (a circuitry) or a computer program and the like stored in the control device.

When the water temperature and/or the fluid temperature satisfy (is equivalent to) a predetermined standard (a predetermined reference value or a predetermined reference temperature), the pressure control part 24 controls the aperture of the operation valve 22 on the basis of a standard control line described later and thus controls the pilot pressure of the pilot fluid outputted from the operation valve 22.

In addition, when the water temperature and/or the fluid temperature does not satisfy (is not equivalent to) the predetermined standard (the predetermined reference value or the predetermined reference temperature), the pressure control part 24 controls the aperture of the operation valve 22 on the basis of a mon-standard control line described later and thus controls the pilot pressure of the pilot fluid outputted from the operation valve 22.

Here, the standard (the reference value or the reference temperature) is a value used for judging whether the heat balance is normal or not. When the standard is satisfied, the heat balance is normal. When the standard is not satisfied, the heat balance is not normal or is abnormal.

In other words, ranges (predetermined ranges) of the water temperature and the fluid temperature are preliminarily determined in the normal heat balance in the embodiment. It can be considered that the heat balance is normal when the water temperature and the fluid temperature are within (are equivalent to) the predetermined ranges. It can be considered that the heat balance is not normal or is abnormal when the water temperature and the fluid temperature are not within (are not equivalent to) the predetermined ranges.

The aperture of the operation valve 22 is controlled to vary (change) the pilot pressure after (behind) the operation valve 22. That is, the pressure control part 24 controls the pilot pressure based on the water temperature and/or the fluid temperature satisfying or not satisfying the standard, the pilot pressure being applied from the third pump P3 to the remote control valves (the left remote control valve 20 and the right remote control valve 21). For convenience of the explanation, the pilot pressure applied from the third pump P3 to the remote control valve is referred to as "a primary pressure" in the following explanation.

A control of the primary pressure by the pressure control part 24 will be explained below.

Figure 2:
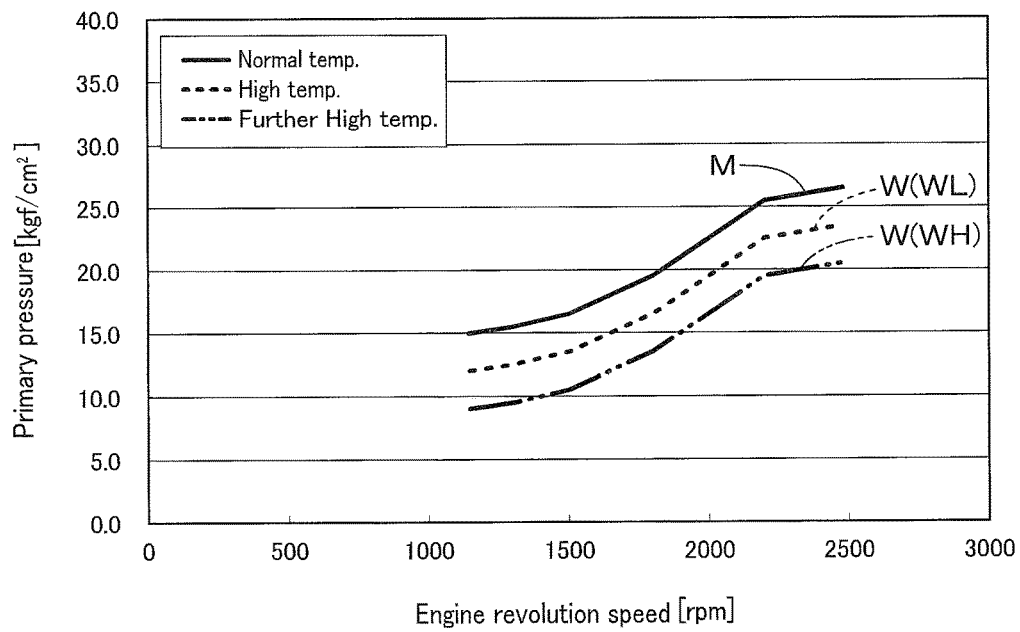
FIG. 2 is a first view illustrating a control map of a relationship between an engine revolution speed and a primary pressure according to the first embodiment.

FIG. 2 illustrates a control map of a relationship between an engine revolution speed and a primary pressure.

As shown in FIG. 2, the control map includes a standard control line M and a non-standard control line W. The standard control line M is a line connecting a plurality of the standard control values (first control values) used in the normal heat balance. The non-standard control line W is a line connecting a plurality of the non-standard control values (second control values) used when the heat balance is not normal or abnormal.

In particular, the standard control line M determines a relationship between the primary pressure and the engine revolution speed in a case where the water temperature and/or the fluid temperature satisfies (is equivalent to) the standard. For example, the standard control line M is a control line representing a relationship between the primary pressure and the engine revolution speed in a case where the water temperature is less than 100 degrees (less than a first temperature) and the fluid temperature is less than 90 degrees (less than the first temperature).

The non-standard control line W determines a relationship between the primary pressure and the engine revolution speed in a case where the water temperature and/or the fluid temperature is not equivalent to the standard. For example, a plurality of the non-standard control lines W are prepared including a low non-standard control line WL and a high non-standard control line WH. The low non-standard control line WL is a control line representing a relationship between the primary pressure and the engine revolution speed in a case where the water temperature is equal to or higher than 100 degrees (equal to or higher than the first temperature) and less than 110 degrees and the fluid temperature is equal to or higher than 90 degrees (equal to or higher than the first temperature) and less than 100 degrees. The high non-standard control line WH is a control line representing a relationship between the primary pressure and the engine revolution speed in a case where the water temperature is equal to or higher than 110 degrees and the fluid temperature is equal to or higher than 100.

That is, the non-standard control line W is constituted of the low non-standard control line WL and the high non-standard control line WH. The low non-standard control line WL is used when the water temperature and/or the fluid temperature are not equivalent slightly to the standard. The low non-standard control line WH is used when the water temperature and/or the fluid temperature are not equivalent significantly to the standard. In the embodiment, the plurality of non-standard control lines W are prepared, the non-standard control lines W corresponding to magnitudes separating from the standard. However, the non-standard control line may be single.

For convenience of the explanation, the case where the fluid temperature is less than 90 degrees and the water temperature is less than 100 degrees (the case where the standard is satisfied) is referred to as "a normal temperature", and the case where the fluid temperature is equal to or higher than 90 degrees and the water temperature is equal to or higher than 100 degrees (the case where the standard is not satisfied) is referred to as "a high temperature"

As shown in FIG. 2, the non-standard control lines (the low non-standard control line WL and the high non-standard control line WH) control the primary pressure to be lower than the primary pressure of the standard control line M at an identical engine revolution speed, and thus are configured to be shifted in parallel to the standard control line M toward a direction of reducing the primary pressure.

A shifting amount of the high non-standard control line WH is larger than a shifting amount of the low non-standard control line WL. Thus, the primary pressure shown by the high non-standard control line WH is the smallest at an identical engine revolution speed. In addition, slopes of the non-standard control lines WL and WH (increment rates of the primary pressure with respect to the engine revolution speed) are similar to a slope of the standard control line M.

The pressure control part 24 monitors the fluid temperature and the water temperature under a state where the engine is in operation, the fluid temperature being measured by the fluid temperature sensor 26b, the water temperature being measured by the water temperature sensor 26a. And, when the fluid temperature and the water temperature are at the normal temperature, the pressure control part 24 determines the primary pressure on the basis of the standard control value specified on the standard control line M.

In addition, when the fluid temperature and/or the water temperature are at the high temperature, the pressure control part 24 determines the primary pressure on the basis of the non-standard control value specified on the non-standard control lines W (the low non-standard control line WL and the high non-standard control line WH). For example, when the fluid temperature and/or the water temperature are varied from being at the normal temperature to being at the high temperature, the pressure control part 24 replaces the standard control line M to the non-standard control line W, and thus refers the non-standard control line W to determine the primary pressure corresponding to the engine revolution speed.

The pressure control part 24 outputs a control signal to the operation valve 22 such that the primary pressure is set to a value determined based on the standard control line M or the non-standard control line W, and thus controls (varies) the aperture of the operation valve 22.

As described above, the pressure control part 24 controls the aperture of the operation valve 22 when the water temperature and/or the fluid temperature is at the high temperature and do not satisfy the standard (the reference temperature), and thereby the pressure control part 24 reduces (lowers) the pressure (the primary pressure) of the pilot fluid to be supplied to the remote control valves (the left remote control valve 20 and the right remote control valve 21).

As the result, the primary pressure of the pilot fluid is reduced (lowered), thereby reducing (lowering) a secondary pressure of the pilot fluid to be supplied to the HST pumps 7L and 7R and thereby reducing (lowering) the outputs of the HST pumps 7L and 7R.

In other words, even in a case where an operation amount of the travel lever 9 in the case where the water temperature and the fluid temperature satisfy the standard (the reference temperature) is identical to an operation amount of the travel lever 9 in the case where the water temperature and the fluid temperature do not satisfy the standard (the reference temperature), the outputs of the HST pumps 7L and 7R are reduced (lowered) when the heat balance is not normal.

In particular, the control using the control map of FIG. 2 reduces (lowers) the primary pressure in a stepwise manner by referring to the non-standard control value that includes at least the plurality of non-standard control lines WL and WH. In this manner, the outputs of the HST pumps 7L and 7R (the operation pumps) are suppressed early on the basis of the non-standard control line WL when the fluid temperature and/or the water temperature are the high temperature. In addition, the outputs of the HST pumps 7L and 7R (the operation pumps) are suppressed on the basis of the non-standard control line WH when the fluid temperature and/or the water temperature are the high temperature.

Figure 3:
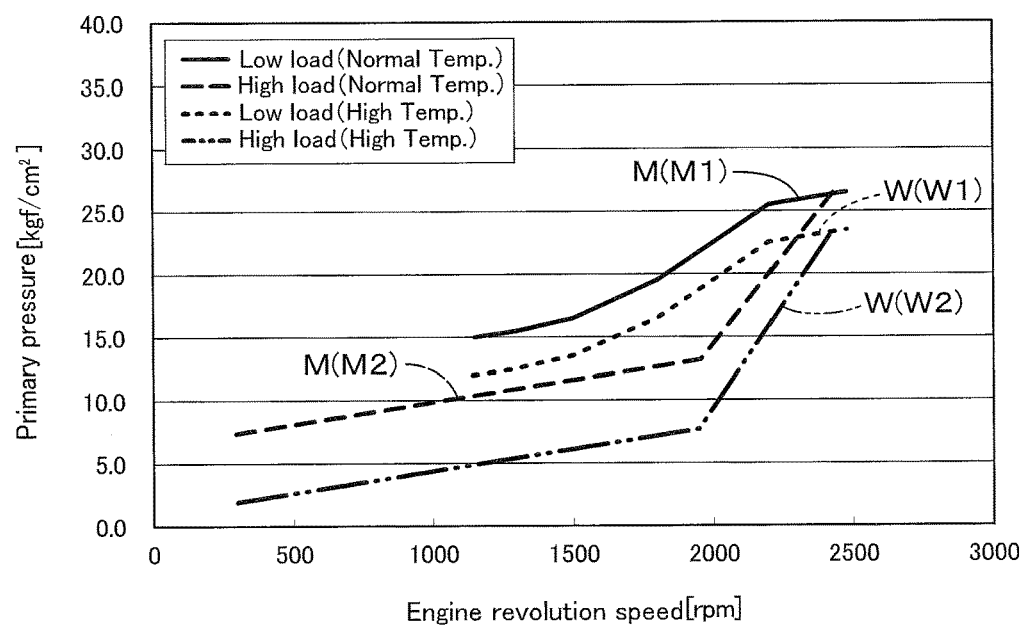
FIG. 3 is a second view illustrating the control map of the relationship between the engine revolution speed and the primary pressure according to the first embodiment.

FIG. 3 illustrates a modified example (a second view) of the control map of the relationship between the engine revolution speed and the primary pressure. The modified example of the control map shown in FIG. 3 will be explained below.

As shown in FIG. 3, the control map includes a plurality of standard control lines M and a plurality of standard control lines W. The standard control lines M are determined corresponding to a load of the engine. The standard control lines W are determined corresponding to the load of the engine.

In particular, the standard control lines M includes a first standard control line M1 and a second standard control line M2. The standard control line M1 is prepared for a case where the load of the engine is low (a low load). The standard control line M2 is prepared for a case where the load of the engine is high (a high load). For example, the first standard control line M1 represents a relationship between the engine revolution speed and the primary pressure in a case where a rate of the engine load is less than 60% that is the "low load".

The second standard control line M2 represents a relationship between the engine revolution speed and the primary pressure in a case where a rate of the engine load is 100% that is "the high load". The first standard control line M1 and the second standard control line M2 are control lines in the case where the fluid temperature and the water temperature are at the normal temperature.

In the embodiment, the rate of engine load less than 60% corresponds to "the low load", and the rate of engine load equal to 100% corresponds to "the high load". However, the rates of the engine load correspond to the low load and to the high load are not limited to the values described above.

The non-standard control line W includes a first non-standard control line W1 and a second non-standard control line W2. The first non-standard control line W1 is configured to be shifted from the first standard control line M1 toward a direction of reducing the primary pressure. The second non-standard control line W2 is configured to be shifted from the second standard control line M2 toward a direction of reducing the primary pressure. A slope of the first non-standard control line W1 is similar to a slope of the first standard control line M1. A slope of the second non-standard control line W2 is similar to a slope of the second standard control line M2.

The first non-standard control line W1 and the second non-standard control line W2 are control lines in the case where the fluid temperature and the water temperature are at the high temperature. That is, the first non-standard control line W1 includes control values used when the fluid temperature and the water temperature are not equivalent to the standard and the load of the engine is small (the low load). The second non-standard control line W2 includes control values used when the fluid temperature and the water temperature are not equivalent to the standard and the load of the engine is large (the high load).

When the primary pressure is controlled under the control map of FIG. 3, the pressure control part 24 monitors the fluid temperature, the water temperature, and the rate of the engine load under a state where the engine is in operation, the fluid temperature being measured by the fluid temperature sensor 26b, the water temperature being measured by the water temperature sensor 26a. Meanwhile, the rate of the engine load is calculated, for example, by using the engine revolution speed and an amount of fuel injected into the engine.

The pressure control part 24 determines the primary pressure on the basis of the first standard control line M1 in the case where the fluid temperature and the water temperature is at the normal temperature. When the fluid temperature and the water temperature are at the high temperature under the state where the engine is in the low load, the pressure control part 24 replaces the first standard control line M1 to the first non-standard control line W1, and thus refers the first non-standard control line W1 to determine the primary pressure corresponding to the engine load.

In addition, when the engine is in the high load and the fluid temperature and the water temperature is at the normal temperatures, the pressure control part 24 determines the primary pressure on the basis of the second standard control line M2. When the fluid temperature and the water temperature are at the high temperature under the state where the engine is in the high load, the pressure control part 24 replaces the second standard control line M2 to the second non-standard control line W2, and thus refers the second non-standard control line W2 to determine the primary pressure corresponding to the engine load.

That is, the pressure control part 24 determines the primary pressure on the basis of the second non-standard control line W2 when the fluid temperature and the water temperature is at the high temperature not equivalent to the standard value under the state where the engine is in the high load.

Then, the pressure control part 24 outputs a control signal to the remote control valves (the left remote control valve 20 and the right remote control valve 21) so as to apply the primary pressure determined by any one of the first standard control line M1, the first non-standard control line W1, the second standard control line M2, and the second non-standard control line W2, and thereby the aperture of the remote control valve is controlled (varied).

Figure 4:
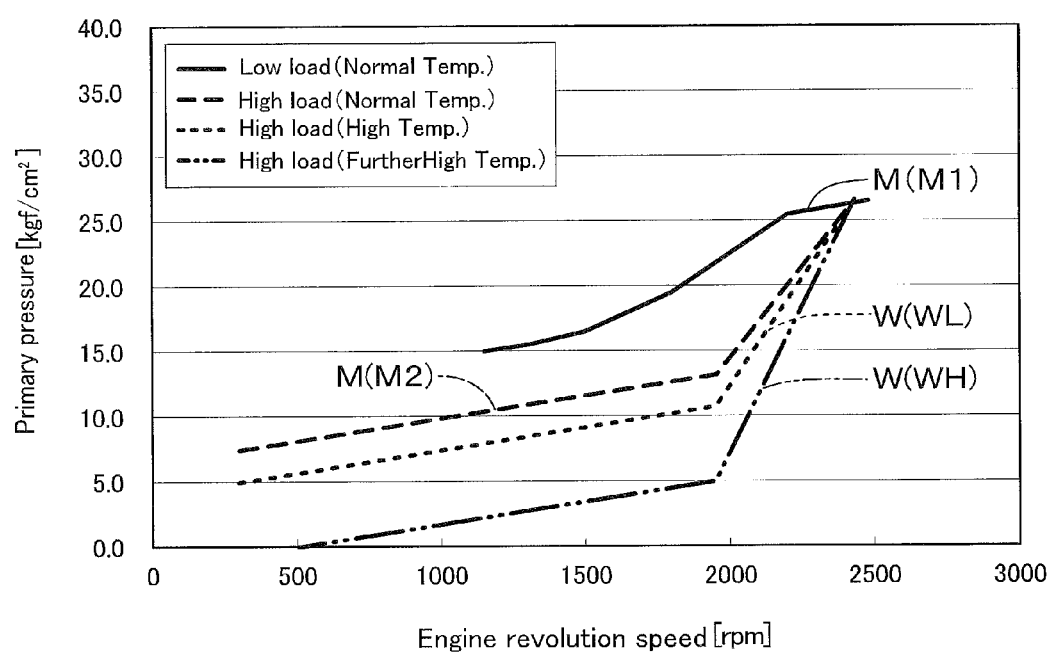
FIG. 4 is a third view illustrating the control map of the relationship between the engine revolution speed and the primary pressure according to the first embodiment.

FIG. 4 illustrates a modified example (a third view) of the control map of the relationship between the engine revolution speed and the primary pressure. The modified example of the control map shown in FIG. 4 will be explained below.

The control map includes the first standard control line M1 and the second standard control line M2. The first standard control line M1 is prepared for the case where the fluid temperature and the water temperature are at the normal temperature under a state where the engine is in the low load. The second standard control line M2 is prepared for the case where the fluid temperature and the water temperature are at the normal temperature under a state where the engine is in the high load.

In addition, the control map prepares at least two non-standard control lines W used in the case where the fluid temperature and the water temperature are at the high temperature under the state where the engine is in the high load. In particular, the control map includes a low non-standard control line WL and a high non-standard control line WH. The low non-standard control line WL is used when the load of the engine is high and is not equivalent slightly to the standard. The high non-standard control line WH is used when the load of the engine is high and is not equivalent significantly to the standard.

In the control map, the slopes of the non-standard control lines W (the low non-standard control line WL and the high non-standard control line WH) are different from the slopes of the standard control lines M (the first standard control line M1 and the second standard control line M2). For example, the slope of the second standard control line M2 is steeper than the slope of the standard control lines M at 2000 rpm of the engine revolution speed, and in this manner the non-standard control lines W (the low non-standard control line WL and the high non-standard control line WH) are configured.

In this manner, the primary pressure are reduced (lowered) early on the basis of the low non-standard control line WL when the engine is in the high load, and the primary pressure are reduced (lowered) on the basis of the high non-standard control line WH when the fluid temperature and the water temperature is at the high temperature, thereby conducting recover of the heat balance.

Second Embodiment

Figure 5:
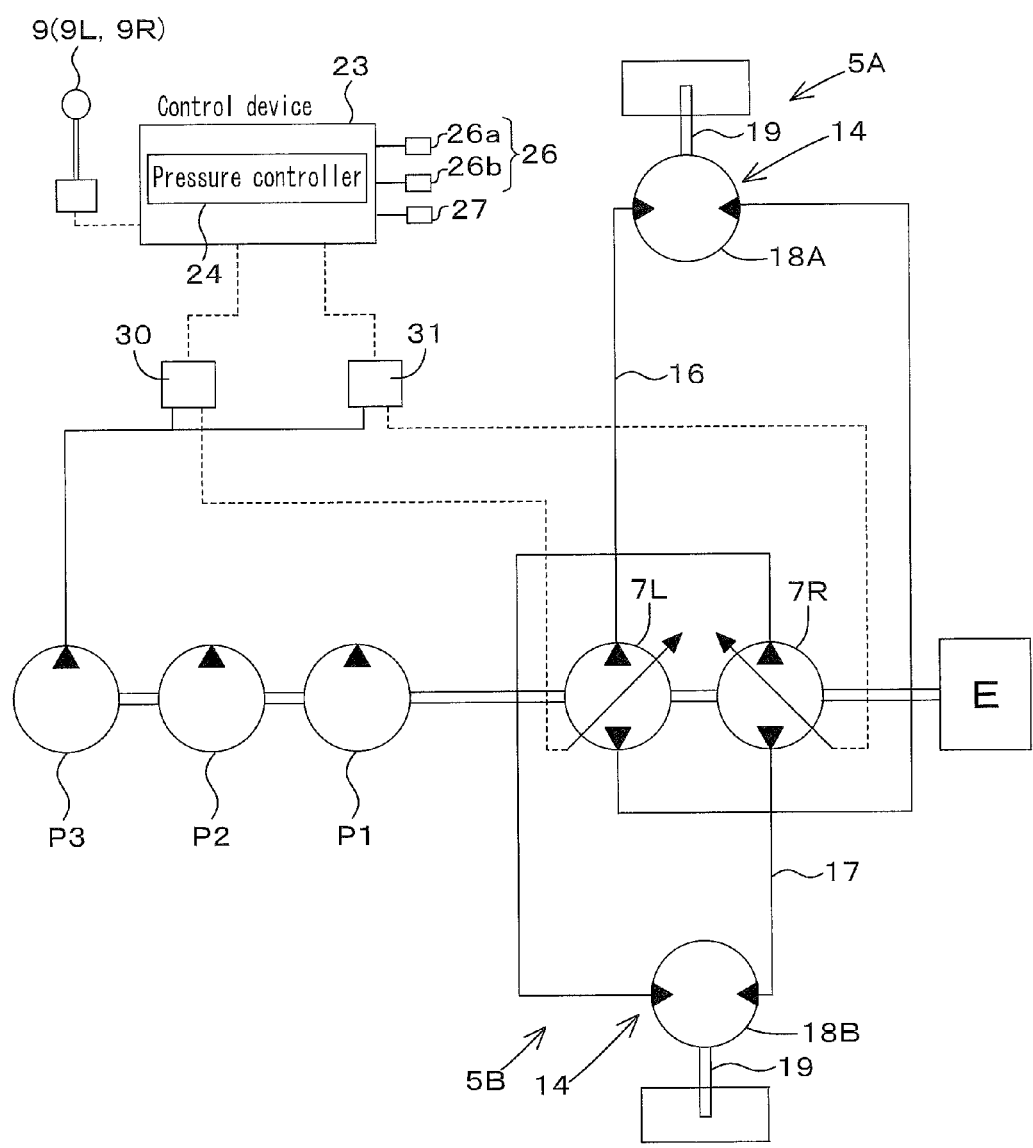
FIG. 5 is a schematic view illustrating a hydraulic circuit for traveling according to a second embodiment of the present invention.

FIG. 5 illustrates a schematic diagram of a hydraulic circuit for traveling according to a second embodiment of the present invention. In the first embodiment mentioned above, the remote control valves are operated directly by the operation levers 9. However, the remote control valves are operated by the control device 23.

The second embodiment of the present invention will be explained in detail below. Explanations of components similar to the components of the first embodiment are omitted.

As shown in FIG. 5, the travel lever 9 is connected to the control device 23. The travel lever 9 is constituted of a joy stick. A left remote control valve 30 and a right remote control valve 31 are connected to the pilot fluid tube.

The remote control valves (the left remote control valve 30 and the right remote control valve 31) are constituted of the electromagnetic proportional valves configured to vary the pilot pressures on the basis of the operation amounts of the travel levers 9 (the left travel lever 9L and the right travel lever 9R). In particular, the remote control valves are the electromagnetic proportional valves configured to vary an aperture of the electromagnetic proportional valve on the basis of the control signal outputted from the control device 23.

In the case where the travel levers 9, the control device 23, and the remote control valves are employed, the operation amounts of the travel levers 9 are inputted to the control device 23. The control device 23 calculates a control amount corresponding to the operation of the travel lever 9 on the basis of the operation amount, that is, an electric current value to set the aperture of the remote control valve (an electric current to magnetize a solenoid). Then, the control device 23 outputs the control signal to the remote control valve, the control signal corresponding to the electric current value. The remote control valve varies (changes) the aperture in accordance with the control signal.

That is, the control device 23 controls the remote control valve in accordance with the operation of the travel lever 9, and thereby controls the pilot pressure in the pilot fluid tube. In this manner, the HST pumps 7L and 7R are operated.

The remote control valve described above is an electromagnetic remote control valve configured to be operated in accordance with the operation of the travel lever 9. However, the remote control valve also serves as an operation valve, and thus is operated under a control of the pressure control part 24 when the temperature is not equivalent to the standard.

An operation of the remote control valve serving as the operation valve will be explained in detail.

Figure 6:
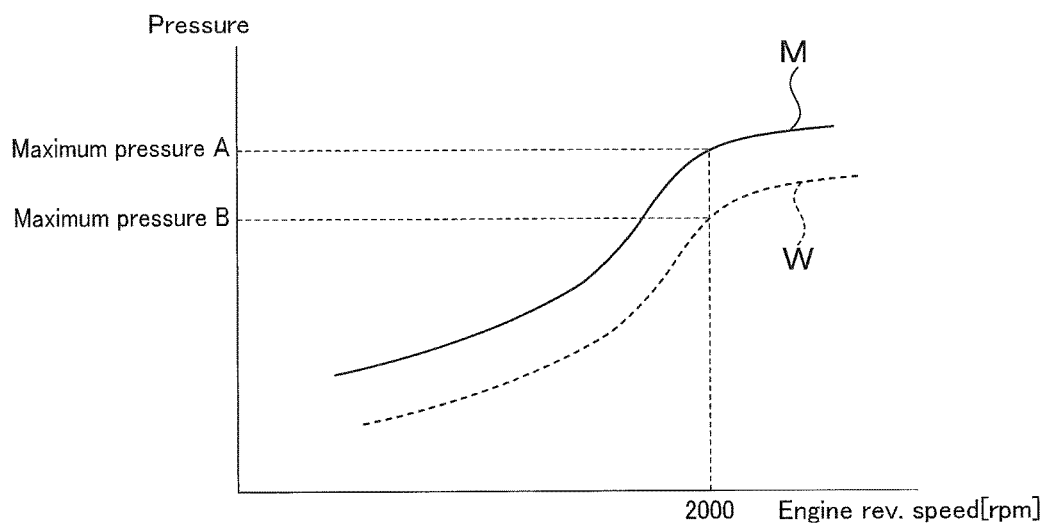
FIG. 6 is a view illustrating a control map of a relationship between an engine revolution speed and a primary pressure according to the second embodiment.

FIG. 6 illustrates a control map of the relationship between the engine revolution speed and the pilot pressure. FIG. 1 is a view illustrating a relationship between the control signal (the pilot pressure) and the operation amount of the travel lever at a predetermined engine revolution speed. For convenience of the explanation, FIG. 7 is a view illustrating a relationship between the pilot pressure and the operation amount of the travel lever at 2000 rpm of the engine revolution speed.

As shown in FIG. 6, the control map includes a standard control line M and a non-standard control line W. The standard control line M is a line used when the heat balance is normal. The non-standard control line W is a line used when the heat balance is not normal.

When the fluid temperature and the water temperature is at the normal temperature, the control device 23 (the pressure control part 24) determines the pilot pressure corresponding to the engine revolution speed by referring to the standard control line M. For example, the pressure control part 24 obtains the "maximum pressure A" from the standard control line M. The "maximum pressure A" is a pilot pressure at the engine revolution speed of 2000 rpm.

Figure 7:
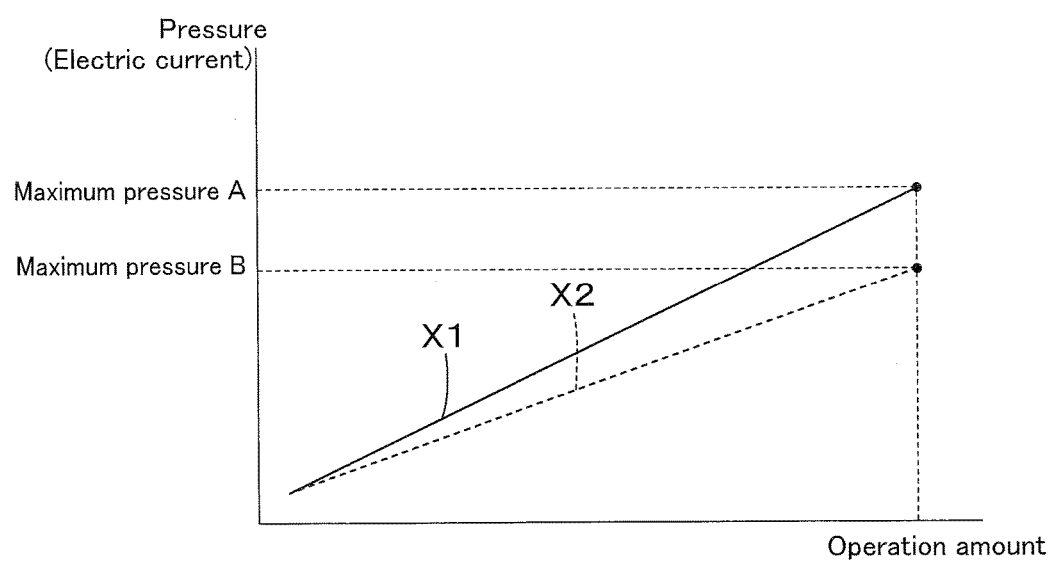
FIG. 7 is a view illustrating a relationship between a control signal (a pilot pressure) and an operation amount of a travel lever with respect to a predetermined engine revolution speed according to the second embodiment.

As shown in FIG. 7, the pressure control part 24 performs the control by using an operation control line X1 that provides the maximum pressure A at the maximum operation amount. The maximum pressure A mentioned above is the pilot pressure corresponding to a case where the operation amount is the maximum (referred to as the maximum operation amount).

That is, the pressure control part 24 sets the maximum pressure at a predetermined engine revolution speed in the normal temperature, and obtains the operation control line X1 having the relationship between the set maximum pressure and the maximum operation amount. And, the pressure control part 24 refers to the operation control line X1 to obtain the pilot pressure based on the operation amount, and outputs a control signal (an electric current value) to the remote control valve, the control signal ordering the obtained pilot pressure.

On the other hand, when the fluid temperature and the water temperature is not at the normal temperature, the pressure control part 24 corrects the control amount (the electric current value) and thus reduces (lowers) the pilot pressure when the temperature is not equivalent to the standard. To be detailed, the pressure control part 24 refers the non-standard control line W and then determined the pilot pressure corresponding to the engine revolution speed when the fluid temperature and the water temperature is not at the normal temperature For example, the pressure control part 24 obtains the "maximum pressure B" from the non-standard control line W. The "maximum pressure B" is a pilot pressure at the engine revolution speed of 2000 rpm. The maximum pressure B is lower than the maximum pressure A described above.

Then, as shown in FIG. 7, the pressure control part 24 performs the control by using an operation control line X2 that provides the maximum pressure B at the maximum operation amount. The maximum pressure B mentioned above is the pilot pressure corresponding to a case where the operation amount is the maximum. The operation control line X2 is prepared to set the pilot pressure to be lower than the operation control line X1.

That is, the pressure control part 24 refers to the non-standard control line W and then corrects the maximum pressure at a predetermined engine revolution speed in the abnormal temperature, and obtains the operation control line X2 having the relationship between the corrected maximum pressure and the maximum operation amount. And, the pressure control part 24 refers to the corrected operation control line X2 to obtain the pilot pressure based on the operation amount, and outputs a control signal (an electric current value) to the remote control valve, the control signal ordering the obtained pilot pressure.

Meanwhile, also in the second embodiment, the pilot pressure corresponding to the engine revolution speed may be obtained by referring the plurality of the non-standard control lines W shown in FIG. 3 and FIG. 4 as in the first embodiment.

In addition, the maximum pressure at the maximum operation amount is obtained by using the control map in the second embodiment. However, the control map is not necessarily required to obtain the maximum operation amount and the maximum pressure but necessarily required to obtain the pilot pressures corresponding to the predetermined operation amounts.

According to the second embodiment, the operation valve is constituted of an electromagnetic remote control valve that is configured to change (vary) the pilot pressure on the basis of the control amount corresponding to the operation of the operation lever. In addition, the pressure control part 24 corrects the control amount when the temperature is not equivalent to the standard, and thus reduces (lowers) the pilot pressure. In this manner, the operation valve and the remote control valve are constituted in one component, and thus the configuration can be simplified.

Third Embodiment

Figure 8:
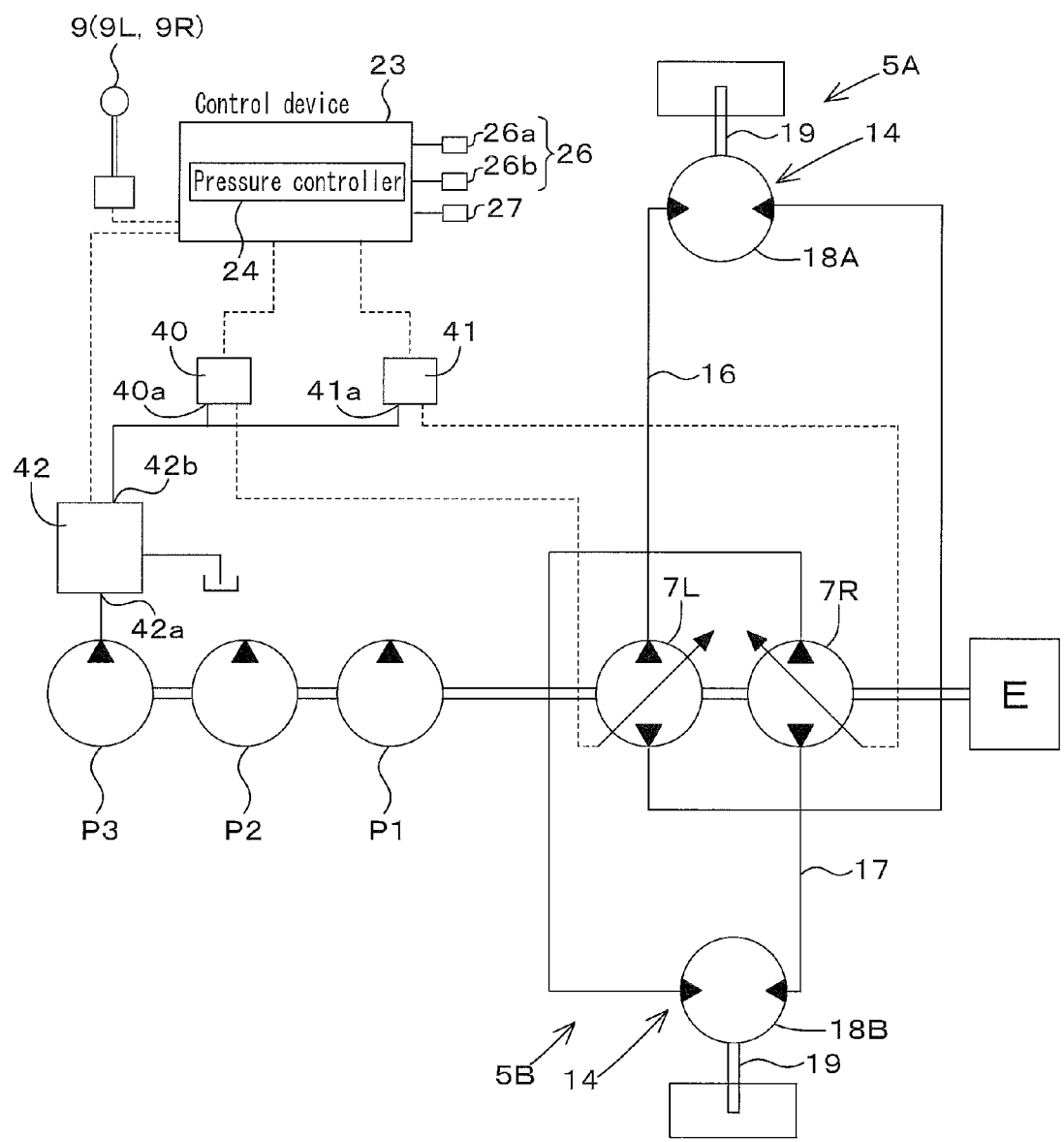
FIG. 8 is a schematic view illustrating a hydraulic circuit for traveling according to a third embodiment of the present invention.

FIG. 8 illustrates a schematic diagram of a hydraulic circuit for traveling according to a third embodiment. The remote control valve and the operation valve are constituted in one component in the second embodiment. However, the remote control valve and the operation valve are constituted in separated components in the third embodiment.

The third embodiment of the present invention will be explained in detail below. Explanations of components similar to the components of the first embodiment and the second embodiment are omitted.

As shown in FIG. 8, the travel lever 9 is connected to the control device 23. The travel lever 9 is constituted of a joy stick. A left remote control valve 40 and a right remote control valve 41 are connected to the pilot fluid tube.

The remote control valves (the left remote control valve 40 and the right remote control valve 41) are constituted of the electromagnetic proportional valves configured to vary the apertures of the remote control valves on the basis of the control signal outputted from the control device 23. An operation valve 42 is disposed between the remote control valves and the third pump P3.

In particular, the third pump P3 is connected to an input port 42a of the operation valve 42. The input port 40a of the left remote control valve 40 and the input port 41a of the right remote control valve 41 are connected to the output port 42b of the operation valve 42.

Operations of the case where the operation valve and the remote control valve are constituted in the separated components will be explained below in detail.

Figure 9:
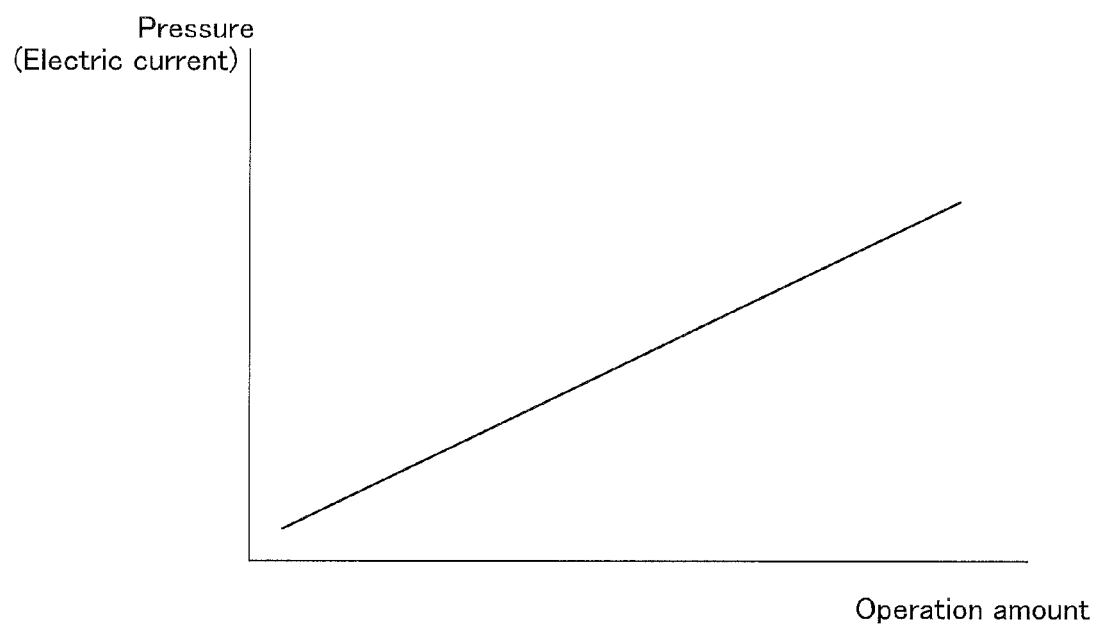
FIG. 9 is a view illustrating a relationship between a pilot pressure and an operation amount of a travel lever with respect to a predetermined engine revolution speed according to the third embodiment.

When the fluid temperature and the water temperature is at the normal temperature, the control device 23 (the pressure control part 24) obtains the pilot pressure based on a predetermined operation on the basis of a relationship between the pilot pressure and the operation amount of the travel lever shown in FIG. 9. The pressure control part 24 outputs the control signal to the remote control valve so as to apply the obtained pilot pressure.

Meanwhile, the relationship between the pilot pressure and the operation amount shown in FIG. 9 may be created by the control map and the like and then stored in the control device 23, and further may be obtained by calculation.

When the fluid temperature and the water temperature is not at the normal temperature, the pressure control part 24 refers to the non-standard control line W to obtain the pilot pressure (the primary pressure) applied from the third pump P3 to the remote control valves (the left remote control valve 40 and the right remote control valve 41) and then controls the operation valve 42 as in the first embodiment. That is, the pressure control part 24 refers to the control map shown in FIG. 2 to FIG. 4 of the first embodiment mentioned above, and then controls (changes) the primary pressure.

According to the third embodiment, the operation valve 42 is disposed between the remote control valves and the third pump P3 (the pilot pump), and further the pressure control part 24 control the operation valve 42 to be tightened when the temperature is not at the standard, thereby reducing (lowering) the pilot pressure.

In this manner, only the operation valve 42 is controlled without changing the control of the remote control valves, and thereby reduces (lowers) the outputs of the HST pumps 7L and 7R that are the operation pumps.

Fourth Embodiment

Figure 10:
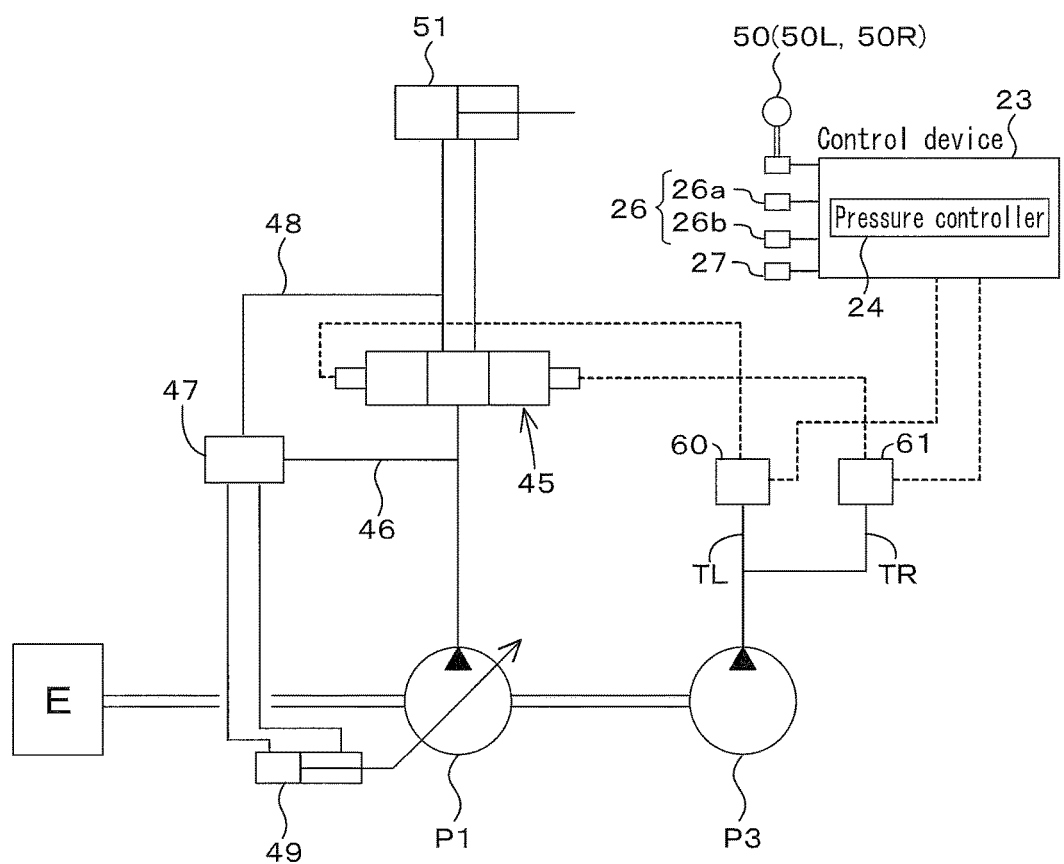
FIG. 10 is a schematic view illustrating the hydraulic circuit for traveling according to the third embodiment.

FIG. 10 illustrates a schematic diagram of a hydraulic circuit for operation according to a fourth embodiment. In the first embodiment to the third embodiment mentioned above, the outputs of the pumps for traveling, that is, the HST pumps 7L and 7R are reduced (lowered). However, in the fourth embodiment, an output of the pump for operation is reduced (lowered). Explanations of components similar to the components of the first embodiment to the third embodiment are omitted.

As shown in FIG. 10, the first pump P1 is constituted of a variable displacement pump having a swash plate. A control valve 45 is connected to an upper stream portion of the first pump P1. A hydraulic actuator 51 is connected to the control valve 45. The hydraulic actuator 51 is disposed on the operation device 4.

The hydraulic system includes a load sensing system. The load sensing system controls the swash plate of the first pump P1, and thus set a differential pressure (PPS signal pressure—PLS signal pressure) to be constant. The differential pressure is obtained from differentiation between the discharge pressure of the first pump P1 (PPS (Pressure of Pump Sensing) signal pressure) and the discharge pressure of the control valve 45 (PLS (Pressure of Load Sensing) signal pressure).

To be detailed, in the fluid tube (the fluid path) extending from the first pump P1 to the control valve 45, a PPS transmission line 46 for taking out the PPS signal pressure is branched from the fluid tube, and the PPS transmission line 46 is connected to a flow rate control part (a flow rate controller) 47. In addition, in the fluid tube (the fluid path) extending from the control valve 45 to the actuator 51, a PPS transmission line 48 for taking out the PLS signal pressure is branched from the fluid tube, and the PLS transmission line 48 is also connected to the flow rate control part (a flow rate controller) 47.

The flow rate control part 47 controls a pressure applied to a flow rate compensation piston 49, and thereby setting the differential pressure to be constant. The flow rate compensation piston 49 controls the swash plate of the first pump P1. In this manner, the discharge amount of the first pump P1 is controlled. That is, the first pump P1 is a pump (an operation pump) constituted of a variable displacement pump configured to supply the operation fluid to the control valve 45 and vary the displacement in accordance with the operation fluid discharged from the control valve 45, the control valve 45 being configured to operate the actuator.

An operation lever 50 (an operation member) is connected to the control device 23. The operation lever 50 is constituted of a joy stick. In addition, a left remote control valve 60 and a right remote control valve 61 are connected to the pilot fluid tube.

The remote control valves (the left remote control valve 60 and the right remote control valve 61) are constituted of the electromagnetic proportional valves configured to vary the pilot pressures on the basis of the operation amounts of the operation levers 50 (the left operation lever 50L and the right operation lever 50R). In particular, the remote control valves are the electromagnetic proportional valves configured to vary an aperture of the electromagnetic proportional valve on the basis of the control signal outputted from the control device 23.

The left remote control valve 60 is connected to a pilot fluid tube (a pilot fluid path) TL extending from the third pump P3 to one of the spools of the control valve 45. The right remote control valve 61 is connected to a pilot fluid tube (a pilot fluid path) TR extending from the third pump P3 to the other one of the spools of the control valve 45.

According to the operation lever 50, the control device 23, and the remote control valve, an operation amount of the operation lever 50 is inputted to the control device 23 at first. The control device 23 calculates a control amount corresponding to an operation of the operation lever, that is, an electric current value (an electric current for magnetizing the solenoid) for setting the aperture of the remote control valve on the basis of the operation amount.

Then, the control device 23 outputs the control signal to the remote control valve. The control signal corresponds to the electric current value. The remote control valve varies the aperture in accordance with the control signal. The pilot pressure is applied to the control valve 45, and thus the control valve 45 is operated by the pilot fluid supplied from the remote control valve.

The remote control valve mentioned above is the electromagnetic remote control valve configured to be operated in accordance with the operation of the operation lever 50. However, the remote control valve also serves as the operation valve as in the second embodiment. The remote control valve is operated under the control of the pressure control part 24 when the temperature is not equivalent to the standard.

The pressure control part 24 will be explained below.

When the fluid temperature and the water temperature is at the normal temperature, the control device 23 (the pressure control part 24) refers to the standard control line M similar to that shown in FIG. 6, and then determines the pilot pressure corresponding to the engine revolution speed. For example, the pressure control part 24 obtains the "maximum pressure A" from the standard control line M. The maximum pressure A is the pilot pressure at the engine revolution speed of 2000 rpm.

As shown in FIG. 7, the pressure control part 24 performs the control by using the operation control line X1 that provides the maximum pressure A at the maximum operation amount. The maximum pressure A mentioned above is the pilot pressure corresponding to a case where the operation amount is the maximum (referred to as the maximum operation amount). That is, the pressure control part 24 sets the maximum pressure at a predetermined engine revolution speed in the normal temperature, and obtains the operation control line X1 having the relationship between the set maximum pressure and the maximum operation amount. And, the pressure control part 24 refers to the operation control line X1 to obtain the pilot pressure based on the operation amount, and outputs a control signal (an electric current value) to the remote control valve, the control signal ordering the obtained pilot pressure.

On the other hand, when the fluid temperature and the water temperature is not at the normal temperature, the pressure control part 24 corrects the control amount (the electric current value) and thus reduces (lowers) the pilot pressure when the temperature is not equivalent to the standard. To be detailed, the pressure control part 24 refers the non-standard control line W and then determined the pilot pressure corresponding to the engine revolution speed when the fluid temperature and the water temperature is not at the normal temperature For example, the pressure control part 24 obtains the "maximum pressure B" from the non-standard control line W. The "maximum pressure B" is a pilot pressure at the engine revolution speed of 2000 rpm. The maximum pressure B is lower than the maximum pressure A described above.

Then, as shown in FIG. 7, the pressure control part 24 performs the control by using an operation control line X2 that provides the maximum pressure B at the maximum operation amount. The maximum pressure B mentioned above is the pilot pressure corresponding to a case where the operation amount is the maximum. The operation control line X2 is prepared to set the pilot pressure to be lower than the operation control line X1.

That is, the pressure control part 24 refers to the non-standard control line W and then corrects the maximum pressure at a predetermined engine revolution speed in the abnormal temperature, and obtains the operation control line X2 having the relationship between the corrected maximum pressure and the maximum operation amount.

And, the pressure control part 24 refers to the corrected operation control line X2 to obtain the pilot pressure based on the operation amount, and outputs a control signal (an electric current value) to the remote control valve, the control signal ordering the obtained pilot pressure.

Meanwhile, also in the fourth embodiment, the pilot pressure corresponding to the engine revolution speed may be obtained by referring the plurality of the non-standard control lines W shown in FIG. 3 and FIG. 4 as in the first embodiment.

In addition, the maximum pressure at the maximum operation amount is obtained by using the control map in the fourth embodiment. However, the control map is not necessarily required to obtain the maximum operation amount and the maximum pressure but necessarily required to obtain the pilot pressures corresponding to the predetermined operation amounts.

According to the fourth embodiment, when the fluid temperature and the water temperature are at the high temperature, the pressure control part 24 suppresses the pilot pressure to be applied to the control valve 45, thus the flow rate of the operation fluid discharged from the control valve 45 is reduced, and thereby the output of the first pump P1 serving as the operation pump can be lowered.

According to the fourth embodiment, the operation valve is constituted of an electromagnetic remote control valve that is configured to change (vary) the pilot pressure on the basis of the control amount corresponding to the operation of the operation lever. In addition, the pressure control part 24 corrects the control amount when the temperature is not equivalent to the standard, and thus reduces (lowers) the pilot pressure. In this manner, the operation valve and the remote control valve are constituted in one component, and thus the configuration can be simplified.

Meanwhile, as a modified example of the fourth embodiment, the remote control valve and the operation valve may be configured separately from each other as described in the third embodiment. In that case, the operation valves are disposed on the pilot fluid tube between the remote control valves and the third pump P3. The pilot fluid tube extends from the third pump P3 to the control valve 45. The pressure control part 24 controls the operation valve to be tightened when the temperature is not at the standard, thereby reducing (lowering) the pilot pressure.

In addition, as another modified example of the fourth embodiment, the mechanical remote control valve may be provided as in the first embodiment, and the operation valve may be disposed between the mechanical remote control valve and the third pump. In that case, the pressure control part 24 controls the operation valve to be tightened when the temperature is not at the standard, thereby reducing (lowering) the pilot pressure.

Fifth Embodiment

Figure 11:
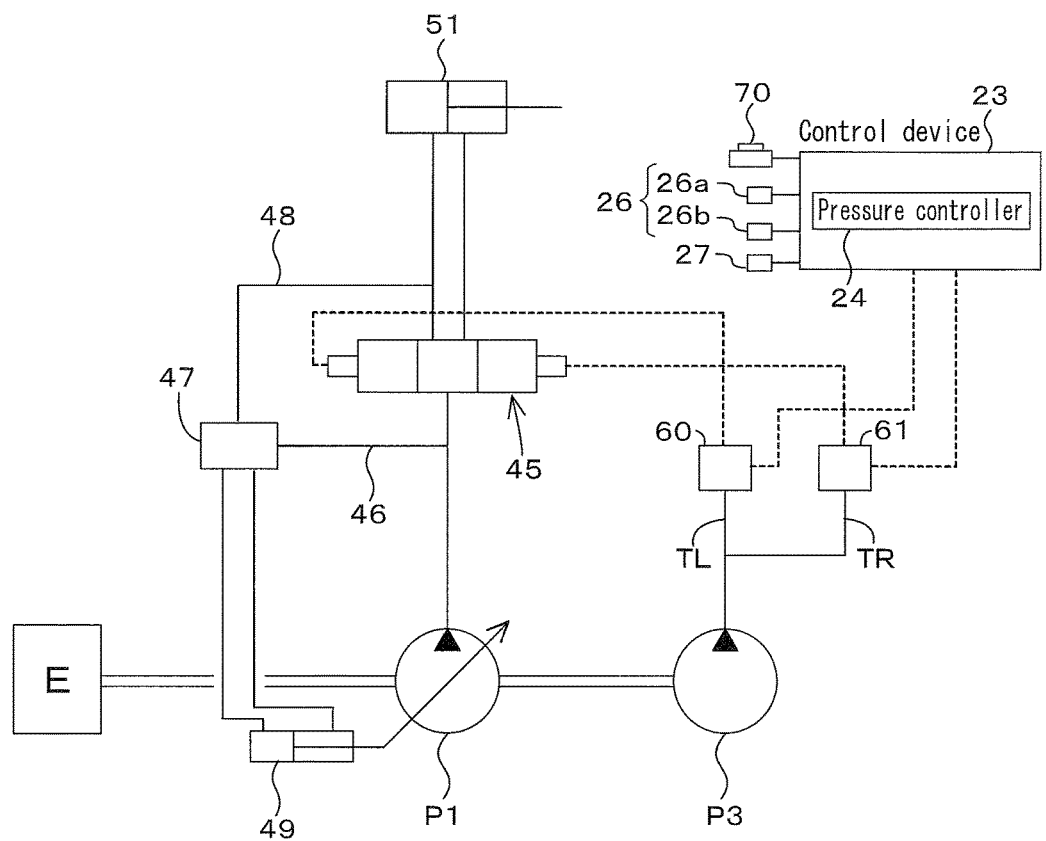
FIG. 11 is a schematic view illustrating a hydraulic circuit for traveling according to a fourth embodiment of the present invention.

FIG. 11 illustrates a schematic diagram of a hydraulic circuit for operation according to a fifth embodiment. In the fourth embodiment mentioned above, the remote control valve and the like are moved by the operation of the operation lever. However, the remote control switch and the like are moved by a switch and the like instead of that configuration. The switch is disposed around the operator seat and the like.

A switch (an operation member) 70 is connected to the control device 23. The switch is constituted of a seesaw switch, a slide switch, or the like. Meanwhile, a display device constituted of a touch panel and the like may be connected to the control device 23, and thus the switch displayed on the display device may be provided as the switch 70 described above.

The remote control valves (the left remote control valve 60 and the right remote control valve 61) are constituted of the electromagnetic proportional valves configured to vary the pilot pressures on the basis of the operation amounts of the switch 70. Other configurations are similar to the configurations described in the fourth embodiment.

According to the switch 70, the control device 23, and the remote control valve, the control device 23 calculates a control amount (an electric current value) corresponding to an operation of the switch on the basis of the operation amount when the fluid temperature and the water temperature are at the normal temperature (are equivalent to the standard value). Then, the control device 23 outputs the control signal to the remote control valve. The control signal corresponds to the electric current value.

The remote control valve varies the aperture in accordance with the control signal. The pilot pressure is applied to the control valve 45, and thus the control valve 45 is operated by the pilot fluid supplied from the remote control valve.

On the other hand, when the fluid temperature and the water temperature are at the high temperature (are not equivalent to the standard value), the control device 23 corrects the control amount (the electric current value), and thereby reduces the pilot pressure applied to the control valve 45.

Also in the fifth embodiment, the control methods and the configurations shown in the first embodiment to the third embodiment cam be employed as in the fourth embodiment.

In the above description, the embodiment of the present invention has been explained. However, all the features of the embodiments disclosed in this application should be considered just as examples, and the embodiments do not restrict a scope of the present invention accordingly. The scope of the present invention is shown not in the above-described embodiments but in claims, and is intended to include all modifications within and equivalent to a scope of the claims.

In the embodiments mentioned above, the measurement device 26 measures a temperature (a fluid temperature) of the operation fluid including the pilot fluid and a temperature (a water temperature) of the cooling water, and then the primary pressure is controlled when the temperatures are at the high temperature. However, the primary pressure may be controlled on the basis of a temperature of an engine oil an outside temperature (for example, an intake air temperature). In other words, it is preferable for the pressure control part 24 to control the primary pressure on the basis of the temperature of any one of the fluid temperature, the water temperature, the temperature of the engine oil, and the outside air.

According to the embodiments mentioned above, a pressure (the pilot pressure) of the pilot fluid can be varied to be reduced when the fluid temperature and the water temperature measured by the measurement device do not satisfy a predetermined standard and are at the high temperature. In this manner, an output of the operation pump can be suppressed. The output of the operation pump is suppressed under a state where the fluid temperature and/or the water temperature are at high temperature, that is, under a state where the heat balance tends to be deteriorated, and thus the heat balance can be improved.

In addition, in a case where the fluid temperature and/or the water temperature are not equivalent to the standard, the pilot pressure can be controlled on the basis of the engine revolution speed represented in the non-standard control value.

In addition, the output of the operation pump is suppressed in a case where the fluid temperature and/or the water temperature are not equivalent to the standard and a load of the engine is high, that is, under a state where the heat balance tends to be deteriorated, and thus the heat balance can be improved quickly.

In a case where the fluid temperature and/or the water temperature are not equivalent to the standard and the engine revolution speed is in a high load, the pilot pressure can be controlled on the basis of the engine revolution speed represented in the non-standard control value corresponding to the high load.

The pilot pressure at a predetermined engine revolution speed can be reduced only by shifting the standard control value toward a direction of reducing the pilot pressure.

In a work machine including a variable displacement pump configured to vary the displacement in accordance with the pilot fluid, the heat balance can be improved quickly only by controlling the operation valve.

In a work machine including a variable displacement pump configured to vary the displacement in accordance with the operation fluid, the heat balance can be improved quickly only by controlling the operation valve.

In a case where the mechanical remote control valve is employed, the mechanical remote control valve being configured to vary the pilot pressure in accordance with an operation of the operation member, the output of the variable displacement pump can be suppressed by tightening the operation valve disposed between the remote control valve and the variable displacement pump.

In a case where the electromagnetic remote control valve is employed, the electromagnetic remote control valve being configured to vary the pilot pressure in accordance with an operation of the operation member, the output of the variable displacement pump can be suppressed by tightening the remote control valve (serving as the operation valve). In particular, the remote control valve serves as the operation valve, and thus the configurations can be simplified.

In a case where the electromagnetic remote control valve is employed, the electromagnetic remote control valve being configured to vary the pilot pressure in accordance with an operation of the operation member, the output of the variable displacement pump can be suppressed by tightening the operation valve disposed on the variable displacement pump. In particular, the remote control valve and the operation valve are configured separately from each other, and thus the pilot pressure can be reduced only by controlling the operation valve with the remote control valve being operated normally.

The pilot pressure can be controlled easily on the basis of any one of the temperature of the operation fluid including the pilot fluid, the temperature of the cooling water, the temperature of the engine oil, and the outside temperature.

In the embodiments mentioned above, the control is performed by using the standard control line M and the non-standard control line W shown in the control map. However, the control may be performed by using the standard control value and the non-standard control value at least. Thus, the control may be performed by using a table preliminarily determining a relation between the engine revolution speed and the pressure (the control value).

The configurations disclosed in the embodiments described above may be employed in other (different) embodiments in which the configurations are not disclosed originally. For example, the hydraulic circuit for traveling shown in the first embodiment may be combined with the hydraulic circuit for operation shown in the fourth embodiment. And, the hydraulic circuit for traveling shown in the second embodiment may be combined with the hydraulic circuit for operation shown in the fourth embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A work machine comprising:
an engine;
a pilot pump to be driven by the engine to supply a pilot fluid;
an operation pump to receive a first pilot fluid to change an output power in accordance with the first pilot fluid, the first pilot fluid being a part of the pilot fluid supplied from the pilot pump;
a pilot fluid tube provided between the pilot pump and the operation pump;
an operation valve connected to the pilot fluid tube to output the first pilot fluid;
a temperature sensor to measure a temperature of at least one of an operation fluid including the pilot fluid, a cooling water, an engine oil, and an outside air; and
a pressure controller to control a first pilot pressure of the pilot fluid outputted from the operation valve when the temperature measured by the temperature sensor is equal to or higher than a first temperature,
wherein the operation pump is a variable displacement pump to supply an operation fluid to a control valve to operate an actuator, the operation pump being to change a displacement of the operation pump in accordance with the pilot fluid outputted from the control valve,
wherein the pilot fluid tube includes a second pilot fluid tube extending from the pilot pump to the control valve, and
wherein the operation valve is connected to the second pilot fluid tube extending from the pilot pump to the control valve.

2. The work machine according to claim 1, comprising:
a remote control valve to be mechanically controlled with an operation of an operation member,
wherein the operation valve is disposed between the remote control valve and the pilot pump, and
wherein the pressure controller controls the operation valve to reduce the first pilot pressure when the temperature measured by the temperature sensor is equal to or higher than the first temperature.

3. The work machine according to claim 1,
wherein the operation valve is an electromagnetic remote control valve to control the first pilot pressure based on a control amount corresponding to operation of an operation member, and
wherein the pressure controller corrects the control amount to reduce the first pilot pressure when the temperature measured by the temperature sensor is equal to or higher than the first temperature.

4. The work machine according to claim 1, comprising:
an electromagnetic remote control valve to control the first pilot pressure based on a control amount corresponding to operation of an operation member,
wherein the operation valve is disposed between the remote control valve and the pilot pump, and
wherein the pressure controller controls the operation valve to reduce the first pilot pressure when the temperature measured by the temperature sensor is equal to or higher than the first temperature.

5. A work machine comprising:
an engine;
a pilot pump to be driven by the engine to supply a pilot fluid;
an operation pump to receive a first pilot fluid to change an output power in accordance with the first pilot fluid, the first pilot fluid being a part of the pilot fluid supplied from the pilot pump;
a pilot fluid tube provided between the pilot pump and the operation pump;
an operation valve connected to the pilot fluid tube to output the first pilot fluid;
a temperature sensor to measure a temperature of at least one of an operation fluid including the pilot fluid, a cooling water, an engine oil, and an outside air;
a pressure controller to control a first pilot pressure of the pilot fluid outputted from the operation valve when the temperature measured by the temperature sensor is equal to or higher than a first temperature; and
a remote control valve to be operated by an operation member,
wherein the remote control valve includes the operation valve to control the first pilot pressure based on a control amount corresponding to operation of the operation member, and
wherein the operation pump is a hydraulic pump constituted of a variable displacement pump to supply the operation fluid to a traveling motor for traveling of the working machine, the variable displacement pump being configured to change the output power in accordance with the first pilot fluid.

6. The work machine according to claim 5, comprising:
wherein the pressure controller controls the operation valve to reduce the first pilot pressure when the temperature measured by the temperature sensor is equal to or higher than the first temperature.

7. A work machine comprising:
an engine;
a pilot pump to be driven by the engine to supply a pilot fluid;
an operation pump to receive a first pilot fluid to change an output power in accordance with the first pilot fluid, the first pilot fluid being a part of the pilot fluid supplied from the pilot pump;
a pilot fluid tube provided between the pilot pump and the operation pump;
an operation valve connected to the pilot fluid tube to output the first pilot fluid;
a temperature sensor to measure a temperature of at least one of an operation fluid including the pilot fluid, a cooling water, an engine oil, and an outside air;
a pressure controller to control a first pilot pressure of the pilot fluid outputted from the operation valve when the temperature measured by the temperature sensor is equal to or higher than a first temperature; and
a remote control valve connected to the pilot fluid tube downstream of the operation valve such that the first pilot fluid outputted from the operation valve is introduced to the remote control valve,
wherein the operation pump is a hydraulic pump constituted of a variable displacement pump to supply the operation fluid to a traveling motor for traveling of the working machine, the variable displacement pump being configured to change the output power in accordance with the first pilot fluid introduced to the remote control valve.

* * * * *